(12) United States Patent
Hope

(10) Patent No.: US 10,676,686 B2
(45) Date of Patent: Jun. 9, 2020

(54) EMULSION FOR INHIBITING THE GROWTH OF MICROORGANISMS

(71) Applicant: Virustatic Ltd., Stockport (GB)

(72) Inventor: Paul Hope, Marple (GB)

(73) Assignee: Virustatic Ltd., Stockport (GB)

( * ) Notice: Subject to any disclaimer, the term of this patent is extended or adjusted under 35 U.S.C. 154(b) by 13 days.

(21) Appl. No.: 15/763,546

(22) PCT Filed: Sep. 30, 2016

(86) PCT No.: PCT/GB2016/053059
§ 371 (c)(1),
(2) Date: Mar. 27, 2018

(87) PCT Pub. No.: WO2017/055874
PCT Pub. Date: Apr. 6, 2017

(65) Prior Publication Data
US 2018/0273863 A1 Sep. 27, 2018

(30) Foreign Application Priority Data

Sep. 30, 2015 (GB) .................... 1517301.6
Dec. 16, 2015 (GB) .................... 1522235.9

(51) Int. Cl.
*C10L 1/32* (2006.01)
*A01N 25/04* (2006.01)
*A01N 43/16* (2006.01)
*C10L 10/02* (2006.01)
*A01N 63/10* (2020.01)

(52) U.S. Cl.
CPC .............. *C10L 1/328* (2013.01); *A01N 25/04* (2013.01); *A01N 43/16* (2013.01); *A01N 63/10* (2020.01); *C10L 10/02* (2013.01); *C10L 2200/0446* (2013.01); *C10L 2200/0476* (2013.01); *C10L 2200/0484* (2013.01); *C10L 2230/083* (2013.01); *C10L 2250/02* (2013.01); *C10L 2250/08* (2013.01); *C10L 2250/082* (2013.01); *C10L 2250/084* (2013.01)

(58) Field of Classification Search
CPC combination set(s) only.
See application file for complete search history.

(56) References Cited

U.S. PATENT DOCUMENTS

2006/0005463 A1    1/2006  Gernon et al.
2016/0168497 A1*   6/2016  Dahms ............... F02M 25/0225
                                                    123/1 A
2016/0192652 A1    7/2016  Hope

FOREIGN PATENT DOCUMENTS

| EP | 2 832 982 | | 2/2015 | |
| EP | 2832982 A1 | * | 2/2015 | |
| GB | 434 109 | | 8/1935 | |
| GB | 2 235 465 | | 3/1991 | |
| GB | 2235465 | * | 3/1991 | |
| JP | H07 138583 | | 5/1995 | |
| WO | 94/09094 | | 4/1994 | |
| WO | WO-9409094 A1 | * | 4/1994 | .............. C10L 1/328 |

OTHER PUBLICATIONS

J. Atanasova et al, "Antibacterial Peptides from Goat and Sheep Milk Proteins," *Biotechnology & Biotechnological Equipment*, vol. 24, No. 2, pp. 1799-1803, Jan. 2010.
Ben Berkhout et al, "Antibacterial effects of the milk protein lactoferrin," *Agro Food Industry Hi Tech*, May 2003.
Written Opinion of the International Search Authority for PCT/GB2016/053059.

* cited by examiner

*Primary Examiner* — Ellen M McAvoy
*Assistant Examiner* — Chantel L Graham
(74) *Attorney, Agent, or Firm* — Ryuh Patent Law; Steven Yu

(57) ABSTRACT

An emulsion comprising water and an immiscible predominantly hydrocarbon-based liquid, wherein the emulsion further comprises at least one protein for inhibiting the growth of microorganisms, said protein containing or being capable of binding to one of: a monosaccharide and an oligosaccharide. Uses of the invention include, but are not limited to: applications in oil well/fracking operations where it is necessary or desirable to neutralise bacteria in the extracted liquid; as an additive emulsion for bio-diesel to reduce emissions, such as NOx etc.; and as an additive in the water of heating/cooling systems for its biocidal properties.

19 Claims, No Drawings

EMULSION FOR INHIBITING THE GROWTH OF MICROORGANISMS

TECHNICAL FIELD OF THE INVENTION

The present invention relates to a method and preparation for inhibiting the growth of microorganisms. More particularly, the invention relates to emulsions comprising a protein, to the use of such emulsions for inhibiting the growth of microorganisms, and to the preparation of such emulsions. The present invention also relates to a fuel/water emulsion comprising a protein for inhibiting the growth of microorganisms at an interface between the fuel and water and to a method for preparing the emulsion.

BACKGROUND TO THE INVENTION

Microorganisms are known to proliferate in many different liquids, particularly where larger volumes of such liquids are contained within receptacles which are predominantly or exclusively adapted only for storage or containment, and within which the liquid is only relatively infrequently exchanged, replenished and/or depleted. In the particular case of storage tanks which are generally closed to the atmosphere, as most are, often there is some stagnation of both the liquid they contain and the air or other gases which fill the remainder of the tank above the liquid. Proper cleaning of such tanks is inconvenient and often difficult, particularly when the tank forms part of a critical liquid supply system, because cleaning processes such as sterilisation and decontamination usually require that the tank be completely purged of its contents so that dedicated cleaning equipment and chemicals can be applied internally of the tank.

To provide a first example, the presence of microorganisms in fuel storage tanks is a problem that has affected the oil industry for many years. Microorganisms present within such tanks are known to feed on petroleum fractions at the water/fuel interface, which in turn promotes the formation of sludge and acidic residues which block and corrode components of the tanks respectively. The presence of sludge and/or acidic residues in the tank can also, in certain instances, adversely affect the quality of the fuel, the shelf life of the storage tank or longevity of the engine in which the fuel is used. The above problems are especially prevalent in storage tanks which comprise crude oil, diesel fuel or kerosene.

To date, biocides such as methylene-bus-oxazolidine (MBO) have been used to control microbial growth. However, biocides are expensive, and in the case of MBO, certain microorganisms have already developed a resistance so that the use of MBO is becoming less suitable as a means for both controlling the growth of, and eliminating microorganisms in fuel storage tanks and engines.

In order to minimise $CO_2$ emissions more environmentally friendly fuels, e.g. biofuels, are now being used, either alone or in combination with conventional petroleum fuels as part of a blend. Biodiesel is a well-known biofuel that is currently being used as an alternative to conventional petroleum fuels. However, fuels which comprise biodiesel suffer from the disadvantage that they are more susceptible to microbial contamination because biodiesel, as well as containing small amounts of water, is hygroscopic, i.e. it attracts and stores water from the surrounding environment. Thus there is a tendency for microorganisms to proliferate to a greater degree in storage tanks containing biodiesel than there is in tanks containing conventional petroleum fuels.

Biodiesels also suffer from the disadvantage that increased concentrations of NOx are produced as a result of the fuel combustion process. NOx emissions are known to be harmful to human health and contribute to the formation of smog in the atmosphere.

Accordingly, it is an object of embodiments of the present invention to provide a means for controlling microbial growth in fuel storage tanks and engines.

Other examples of liquid storage prone to microorganism proliferation include cooling water tanks which supply oil refineries and other chemical plants, thermal power stations and heating ventilation and air-conditioning (HVAC) systems, swimming pools, and cooling towers (both natural and induced draft). In particular, cooling towers are essentially heat rejection devices which reject waste heat to the atmosphere through the cooling of a water stream to a lower temperature. Cooling towers may either use the evaporation of water to remove process heat and cool the working fluid to near the wet-bulb air temperature or, in the case of closed circuit dry cooling towers, rely solely on air to cool the working fluid to near the dry-bulb air temperature. Cooling towers vary in size from small roof-top units to very large hyperboloid structures commonly seen adjacent power stations, but in essence, all such towers employ water as the coolant, and as such that water is commonly contained in a large receptacle in which conditions for microorganism proliferation are often optimised.

As far as the storage and/or containment of water is concerned, inhibiting microorganism proliferation is important if not critical because of the potential that humans may come into contact with contaminated water. For example, there have been many publicised outbreaks of Legionnaire's disease in hospitals, and such have been traced to the existence of the "*legionella pneumophila*" microorganism in water storage tanks in and around the hospitals where outbreaks have occurred. In swimming pools, microorganism proliferation can result in a biofilm on the water surface, which at the very least is aesthetically off-putting, and at worst has potentially harmful health implications. Although the chlorination of water can provide some resistance to microorganism proliferation in standing bodies of water (including possibly drinking water reservoirs), the use of chlorine is being increasingly disparaged as it has been suggested that chlorine may be the root cause of various short and long term neurological disorders.

Accordingly, it is an object of embodiments of the present invention to provide a means for controlling microbial growth in liquid storage receptacles and tanks, particularly those adapted for storing or containing water or fuels, and in the liquids themselves commonly contained in such receptacles and tanks.

It is also an object of embodiments of the present invention to provide an alternative to conventional biocides for controlling the growth of microorganisms in liquid storage receptacles and tanks, and in the liquids contained therein.

It is also an object of embodiments of the present invention to provide an alternative to biocides for controlling the growth of microorganisms in fuel storage tanks and engines.

It is another object of embodiments of the present invention to reduce water absorption in fuels, and in particular fuels that comprise biofuels such as biodiesel.

It is a further object of embodiments of the present invention to reduce NOx emissions resulting from the combustion of fuels containing biodiesel.

SUMMARY OF THE INVENTION

Various aspects of the invention are set forth in the appended claims.

According to an aspect of the invention, there is provided an emulsion comprising water and an immiscible predominantly hydrocarbon-based liquid, wherein the emulsion further comprises at least one protein containing or being capable of binding to a saccharide.

Preferably, the protein is at least partially dissolved in the water, or in emulsion therewith as a water-protein emulsion, such being hereinafter referred to as a water-protein mix, and preferably the emulsion is formed by adding said water-protein mix to the hydrocarbon-based liquid, or vice versa.

According to another aspect of the invention, there is provided an emulsion comprising water and a fuel, wherein the emulsion comprises a protein for inhibiting the growth of microorganisms at an interface between the fuel and water, and wherein the protein contains or is capable of binding to a saccharide. It was found that emulsions comprising such proteins were effective at inhibiting the growth of microorganisms at the fuel/water interface and at reducing the formation of bio-films and sludge within fuel storage tanks. It was also found that the presence of such proteins at the fuel/water interface reduced the amount of water absorbed into the fuel which enables fuels, and in particular biofuels such as bio-diesel which are readily saturated, to meet current regulatory standards relating to the water content in fuels. It was also found that NOx emissions could be reduced when the emulsion comprised the protein that contains or is capable of binding to a saccharide.

The saccharide may be a monosaccharide or an oligosaccharide.

Preferably the protein is a glycoprotein or a lectin, both of which are capable of binding to the exterior cell walls of microorganisms such as bacteria, microbes and fungi.

Preferably the protein is lipophilic, and is further preferably a glycoprotein or a lectin (both of which are capable of binding to the exterior cell walls of microorganisms such as bacteria, microbes and fungi), further preferably an iron-binding glycoprotein, yet further preferably a globular protein, even further preferably a transferrin, and most preferably one of lactoferrin and lactoglobulin, ideally lactoferrin. Lactoferrin has antimicrobial properties and is also capable of acting as a bactericide and/or as a fungicide. Lactoferrins bind to lipopolysaccharides present in cell walls of, e.g. bacteria, which adversely affects cell wall permeability and causes it to break down. Lactoferrin is particularly preferred since it is effective against bacteria of the genera *Pseudomonas, Burkholderia,* and *Bacillus* that are known to contaminate fuels such as diesel. As an alternative to Lactoferrin, other glycoproteins having bactericidal and/or fungicidal properties may be used. For instance, blood proteins such as Fetuin and/or a milk protein such as Kappa Casein may be used instead or in addition to Lactoferrin. It is preferred to use milk proteins since they are relatively inexpensive and readily available.

Preferably the immiscible predominantly hydrocarbon-based liquid is one of: an oil, preferably a non-toxic oil such as vegetable oil, and a fuel oil or hydrocarbon-based fuel.

The emulsion may be a water-in-oil emulsion in which water (aqueous phase) is dispersed in the fuel (oil phase). Preferably the water (aqueous phase) of the emulsion comprises the glycoprotein.

The emulsion may be either a water-in-oil emulsion wherein the water-protein mix (the dispersed phase) is dispersed in the immiscible predominantly hydrocarbon-based oil (the continuous phase), or an oil-in-water emulsion wherein the immiscible predominantly hydrocarbon-based oil (the dispersed phase) is dispersed in the water, or water-protein mix as the case may be (the continuous phase).

It will be understood that a water-in-oil emulsion will be much more readily accepted by an oil or fuel (i.e. much less prone to separation in the volume of fuel or oil to which it may be added), whereas an oil-in-water emulsion will be much more readily accepted by water or a water-based solution.

Preferably, the emulsion is subjected to a further mixing treatment, most preferably by vortexing, for example using a colloid mill, by vibration, by ultrasonic mixing, using an emulsion tube or by any other suitable mixing technique resulting in a reduction of the droplet size of the dispersed phase component of an emulsion and so increase the stability of the emulsion in that the dispersed phase is much less likely to undergo separation from the continuous phase. For example, a colloid mill capable of spinning at up to 18000 r.p.m. can induce very high shear forces within the emulsion leading to smaller droplet sizes of the dispersed phase, in some cases as low as 1 µm giving a very stable emulsion. Alternatively (or additionally), the emulsion may be subjected to ultrasound, also being well-established method for particle size reduction in dispersions and emulsions. For example, ultrasonic processors are currently used in the creation of nano-size material slurries, dispersions and emulsions because of the potential in the de-agglomeration and the reduction of primaries. These are the mechanical effects of ultrasonic cavitation.

In the case of an oil-in-water emulsion, preferably the emulsion comprises at least two glycoproteins. Preferably each of the two proteins is polar. Most preferably the polarities are opposite. Yet further preferably, the first glycoprotein is apolactoferrin and the second glycoprotein is lactoglobulin.

The invention present invention is also considered to extend to the treatment of a body of water by addition of a predetermined quantity of an oil-in-water emulsion thereto. In particular, it is envisaged that water in any reservoir, container, vessel, tank, such as for example might be provided in a cooling system, might be treated by such an emulsion. It is believed that within the emulsion, the lactoferrin and lactoglobulin molecules, being of opposite polarities, and having an affinity for the oil droplets within the emulsion, form themselves around the oil droplets, and the combined glycoprotein-oil structures are then capable entering the larger body of water in suspension. Once in suspension in the larger body of water, apart from binding to the pathogen, the bactericidal and/or biocidal effects of the lactoferrin are achieved as a result of the glycoproteins, particularly apolactoferrin, winning the competition for free iron ions in the water against other microorganisms, such as *legionella pneumophila*. It is also believed that the glycoprotein disrupts pathogen signalling pathways, and would therefore inhibit the formation of *legionella* biofilms in pipes and tanks in general. In certain embodiments, emulsions comprising lactoferrin could be used more generally as biocides and biofilm inhibitors in swimming pools and in potable water supplies.

In a further aspect of the invention, the immiscible predominantly hydrocarbon-based liquid is a hydrocarbon fuel. Preferably, the emulsion comprises a protein (such as mentioned above) for inhibiting the growth of microorganisms at an interface between the fuel and water. It has been found that emulsions comprising such proteins have been effective at inhibiting the growth of microorganisms at the fuel/water interface and at reducing the formation of biofilms and sludge within fuel storage tanks. It has also been found that the presence of such proteins at the fuel/water interface reduced the amount of water absorbed into the fuel which enables fuels, and in particular biofuels such as bio-diesel which are readily saturated, to meet current regulatory standards relating to the water content in fuels. It has also been found that NOx emissions can be reduced when a fuel containing a small quantity of the emulsion comprising the protein is combusted.

Most preferably, a water-in-oil emulsion is used as a treatment for larger bodies of fuel or other immiscible predominantly hydrocarbon-based liquids.

The water-in-oil emulsion formed contains at least 1% water. Preferably, the emulsion contains 5-50% water. Emulsions which comprise 5-50% water and the protein have been shown to curtail emissions of NOx on combustion of the fuel within which the emulsion is mixed, and also reduce the emissions level of CO, HC, and smoke, thereby prolonging the service life span for lube oil and improving the anti-wear characteristics of engine components.

The fuel may be a fuel oil which may be defined as any liquid fuel that is burned in a furnace or boiler for the generation of heat or used in an engine for the generation of power. Preferred fuel oils comprise petroleum fractions such as diesel, petrol or kerosene.

Alternatively, the fuel may be a biofuel such as biodiesel. Biodiesel is a non-toxic, biodegradable fuel made from vegetable oil, waste cooking oil, animal fat or fish oil.

The fuel may be a blend of a fuel oil and a biofuel, e.g. of diesel and biodiesel. By using a blend, reductions in greenhouse gas, e.g. $CO_2$, emissions can be obtained.

Preferably the blend contains up to 10% biofuel which enables the blend to be used in motor vehicle engines without modification. Blends containing 2-10% or 5-10% biofuel are preferred.

The blend may contain more than 10% biofuel, and in preferred ranges the blend may comprise at least 20%, 30%, 40%, 50%, 60%, 70%, 80% or 90% biofuel. However, such blends may only be suitable for use in motor vehicles having specially adapted engines.

According to another aspect of the invention there is provided a method for inhibiting the growth of microorganisms in a fuel/water emulsion, which comprises the steps of:
a. providing a solution comprising a protein that contains or is capable of binding to a saccharide, and b. adding the solution to the fuel to form the emulsion.

The addition of the solution to the fuel has the effect that the growth of microorganisms at the fuel/water interface is inhibited, the absorption of water into the fuel, either during storage or transport of the fuel can be reduced, and NOx emissions resulting from the combustion of fuel may be curtailed, i.e. relative to fuels in which the solution has not been added.

Preferably the solution is added to the fuel at the start of the supply chain, i.e. at the refinery. However, the solution is also suitable for breaking down and cleaning biofilms in existing storage tanks and supply pipes.

The protein may be a glycoprotein such a Lactoferrin, Kappa Caesin or Fetuin or a lectin.

Preferably the solution comprises water.

According to another aspect of the invention there is provided a method for inhibiting the growth of microorganisms within a receptacle containing a volume of one of: fuel and water, which comprises the steps of:
a. providing a solution comprising a protein that contains or is capable of binding to a saccharide, and
b. one of: adding the solution to the fuel to form a water-in-oil emulsion, and adding fuel to the solution to form an oil-in-water emulsion.
c. Adding either the water-in-oil emulsion to the volume of fuel, or the oil-in-water emulsion to the volume of water, and optionally
d. Mixing the emulsion into the volume liquid.

In the case of adding a water-in-oil emulsion to a much larger volume of fuel, this can have the effect of inhibiting both the growth of microorganisms at any fuel/water interface within the combined volume of liquid. Absorption of water into the fuel can also be inhibited, either during storage or transport of the fuel, and NOx emissions resulting from the combustion of fuel may also be reduced, i.e. relative to fuels in which the emulsion was not added.

Preferably the emulsion is added to the fuel at the start of the supply chain, i.e. at the refinery. However, the solution is also suitable for breaking down and cleaning biofilms in existing storage tanks and supply pipes.

Preferably the method comprises the step of providing the protein in an amount capable of inhibiting the growth of microorganisms.

Preferably the method comprises the step of dissolving the protein in a solvent such as water. Up to 10 g of the protein may be dissolved per litre of solvent. Preferably 0.1-10 g of the protein is dissolved per litre of solvent, more preferably 1-10 g of the protein is dissolved.

Preferably the method comprises the step of adding the emulsion to the fuel in an amount below which the solution is absorbed by the fuel. Up to 1.5 g of the emulsion may be added per litre of fuel. Preferably 0.5-1.5 g of the emulsion is added per litre of fuel.

According to a further aspect of the invention there is provided use of a protein that contains or is capable of binding to saccharides for inhibiting the growth of microorganisms in fuel and water storage tanks, and engines.

According to a yet further aspect of the invention there is provided use of a protein that contains or is capable of binding to saccharides for reducing water absorption in fuel.

According to a yet further aspect of the invention there is provided use of a protein that contains or is capable of binding to saccharides for reducing NOx emissions resulting from the combustion of fuel.

DETAILED DESCRIPTION OF THE INVENTION

In order that the invention may be more clearly understood an embodiment thereof will now be described, by way of example only.

It is to be noted that the following example is provided with exclusive reference to the embodiment of the invention in which a water-in-oil emulsion is formed comprising a glycoprotein, specifically lactoferrin, and this emulsion is then added to a much larger volume of a hydrocarbon-based fuel to inhibit the growth of microorganisms therein, and possibly also eliminate existing microorganisms extant therein.

According to a first example (E1) a solution which is capable of inhibiting the growth of microorganisms in fuel storage tanks was prepared by providing 0.1-10 g of Lactoferrin and then adding the Lactoferrin to 1 litre of water. The solution was then stirred at room temperature and pressure until the Lactoferrin was fully dissolved as determined by visual inspection.

1 litre of diesel fuel was then provided in a sterilised vessel and the bacterial count was quantified. 1.5 g of the Lactoferrin solution above was then added to the diesel and the resultant mixture was stirred so as to form a water-in-oil emulsion. The emulsion was kept at standard temperature and pressure and was monitored over a period of 10 days. After 10 days had elapsed the bacterial count was quantified to determine the extent of bacterial growth in the vessel. As a comparative example (C1) 1 litre of diesel obtained from the same diesel source as in E1 was provided in a sterilised vessel and was monitored for the same period and under the same conditions. Bacterial counts were also taken after a period of 10 days had elapsed.

The results of the test showed that the bacterial count in emulsion E1 was less than the bacterial count in comparative example C1. This shows that the presence of Lactoferrin at the fuel/water interface is effective at inhibiting the growth of bacteria in fuel/water emulsions.

Uses of the invention include, but are not limited to:

Applications in oil well/fracking operations where it is necessary or desirable to neutralise bacteria in the extracted liquid.

The invention makes it possible to form colloids comprising water and at least two polar glycoproteins of opposite polarities suspended in the water (for example, the first glycoprotein being apolactoferrin and the second glycoprotein being lactoglobulin).

The resultant colloid can be added to oil to make an emulsion. That emulsion can then be added to bio-diesel and emulsified and then that mixture added to regular diesel to reduce emissions, such as NOx etc.

Alternatively, the emulsion can be added to water used in heating/cooling systems, e.g. cooling plant, HVAC, etc. to sterilise the water are thereby reduce or prevent, in certain cases, the occurrence of *Legionella.*

Alternatively, the colloid can be added to water used in oil extraction processes. The treated water could mix with, say, the crude oil being extracted to form emulsion. This could lead to biocidal activity in the extracted oil, thereby increasing its life.

The following statements are not the claims, but relate to various features of possible embodiments of the invention:

Statement 1. An emulsion comprising water and a fuel, wherein the emulsion comprises a protein for inhibiting the growth of microorganisms at an interface between the fuel and water, and wherein the protein contains or is capable of binding to a saccharide.

Statement 2. An emulsion according to statement 1, wherein the protein is a protein that is capable of binding to a cell wall of the microorganism.

Statement 3. An emulsion according to statement 1 or statement 2, wherein the protein comprises a glycoprotein, Statement 4. An emulsion according to statement 3, wherein the glycoprotein comprises a milk protein.

Statement 5. An emulsion according to statement 3, wherein the protein comprises Lactoferrin, Kappa Caesin, or Fetuin Statement 6. An emulsion according to statement 1 or statement 2, wherein the protein comprises a lectin.

Statement 7. An emulsion according to any one of the preceding statements, wherein the water is dispersed in the fuel.

Statement 8. An emulsion according to either statement 1 or statement 2, wherein the water comprises the glycoprotein.

Statement 9. An emulsion according to any one of the preceding statements, wherein the emulsion contains at least 1% water.

Statement 10. An emulsion according to any one of the preceding statements, wherein the emulsion contains 5-50% water.

Statement 11. An emulsion according to any one of the preceding statements, wherein the fuel comprises a fuel oil.

Statement 12. An emulsion according to any one of the preceding statements, wherein the fuel oil comprises diesel, petrol or kerosene.

Statement 13. An emulsion according to any one of the preceding statements, wherein the fuel comprises a blend of fuel oil and a biofuel.

Statement 14. An emulsion according to statement 13, wherein the blend comprises up to 2% biofuel.

Statement 15. An emulsion according to statement 13 or statement 14, wherein the blend comprises up to 5% biofuel.

Statement 16. An emulsion according to any one of statements 13-15, wherein the blend comprises up to 10% biofuel.

Statement 17. An emulsion according to statement 13, wherein the blend comprises more than 10% biofuel.

Statement 18. An emulsion according to any one of statements 1-10, wherein the fuel is a biofuel.

Statement 19. An emulsion according to any one of statements 13-18, wherein the biofuel comprises biodiesel.

Statement 20. Method for inhibiting the growth of microorganisms in a fuel/water emulsion, which comprises the steps of: a) providing a solution comprising a protein that contains or is capable of binding to a saccharide, and b) adding the solution to the fuel to form the emulsion.

Statement 21. Method according to statement 20, wherein the solution is prepared by dissolving the protein in water.

Statement 22. Method according to statement 21, wherein the solution is prepared by dissolving up to 10 g of the protein per litre of water.

Statement 23. Method according to any one of statements 20-22, wherein the protein comprises a glycoprotein or a lectin.

Statement 24. Method according to any one of statements 20-23, wherein the emulsion is formed by adding up to 1.5 g of solution per litre of fuel.

Statement 25. Use of a protein which contains or is capable of binding to a saccharide for inhibiting the growth of microorganisms in a fuel/water emulsion.

Statement 26. Use of a protein that contains or is capable of binding to saccharides for reducing water absorption in fuel.

Statement 27. Use of a protein that contains or is capable of binding to saccharides for reducing NOx emissions resulting from the combustion of fuel.

The invention is not restricted to the details of the foregoing embodiments, which are merely exemplary of the invention. The foregoing embodiments are described by way of example only and many variations are possible without departing from the scope of the invention, which is set forth in the appended claims.

The invention claimed is:

1. A method of inhibiting the growth of microorganisms in a storage tank, receptacle, or pipe containing oil, the method comprising:

combining the oil with an aqueous mixture comprising:

water; and an intact glycoprotein capable of binding to or containing a monosaccharide or an oligosaccharide;

thereby forming an emulsion of the water, glycoprotein, and oil; and inhibiting the growth of microorganisms in the storage tank, receptacle, or pipe.

2. The method of claim 1, wherein the glycoprotein is lipophilic.

3. The method of claim 1, wherein the glycoprotein is a milk protein.

4. The method of claim 1, wherein the glycoprotein is lactoferrin, apolactoferrin, lactoglobulin, or κ-casein.

5. The method of claim 1, wherein the glycoprotein is fetuin.

6. The method of claim 1, wherein the glycoprotein is a first protein, and wherein the aqueous mixture further comprises a second protein that is capable of binding to or containing a monosaccharide or an oligosaccharide.

7. The method of claim 6, wherein the first protein has a polarity that is opposite the second protein.

8. The method of claim 7, wherein the first protein is apolactoferrin and the second protein is lactoglobulin.

9. The method of claim 1, wherein the glycoprotein comprises a lectin.

10. The method of claim 1, wherein the oil is a fuel oil, a non-fuel oil, a biofuel, a vegetable oil, an animal oil, a fish oil, or any blend thereof.

11. The method of claim 1, wherein the emulsion contains at least 1% water.

12. The method of claim 11, wherein the emulsion contains 5-50% water.

13. The method of claim 1, wherein, in the aqueous mixture, up to 10 grams of the glycoprotein is dissolved or dispersed per liter of water.

14. The method of claim 1, wherein the storage tank, receptacle, or pipe is closed to the atmosphere.

15. The method of claim 1, wherein the oil is biodiesel.

16. The method of claim 1, wherein the glycoprotein reduces water absorption in the oil.

17. The method of claim 1, wherein:
the glycoprotein is lactoferrin;
the emulsion contains 5-50% water; and
in the aqueous mixture, up to 10 grams of the lactoferrin is dissolved or dispersed per liter of water.

18. The method of claim 1, wherein the aqueous mixture contains 1-10 grams of the lactoferrin per liter of water and the oil is a fuel oil.

19. The method of claim 18, wherein 0.5-1.5 grams of the aqueous mixture is added per liter of fuel oil.

* * * * *